D. EDWARD.

MOP AND BRUSH HOLDER.

No. 7,218

Reissued July 11. 1876.

Witnesses

Geo. D. Walker

Chas. H. Smith

Inventor.

David Edward.

per Lemuel W. Serrell.

atty.

N. PETERS, PHOTO-LITHOGRAPHER, WASHINGTON, D.C.

UNITED STATES PATENT OFFICE.

DAVID EDWARD, OF MONTREAL, QUEBEC, CANADA, ASSIGNOR, BY MESNE ASSIGNMENTS, TO P. & F. CORBIN.

IMPROVEMENT IN MOP AND BRUSH HOLDERS.

Specification forming part of Letters Patent No. 116,574, dated July 4, 1871; reissue No. 7,218, dated July 11, 1876; application filed February 7, 1876.

*To all whom it may concern:*

Be it known that I, DAVID EDWARD, of Montreal, in the Province of Quebec and Dominion of Canada, have invented a new and useful Improvement in Mop and Brush Holder; and I do hereby declare that the following is a full, clear, and exact description thereof, which will enable others skilled in the art to make and use the same, reference being had to the accompanying drawing, forming part of this specification, in which—

Figure 2:
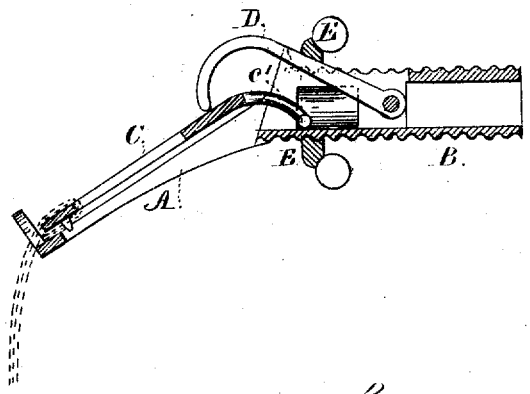
Figure 1:
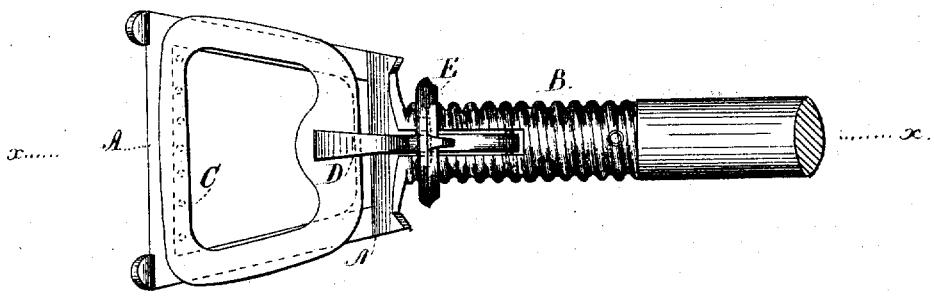

Figure 1 is a top view of my improved holder. Fig. 2 is a sectional view of the same, taken through the line *x x*, Fig. 1.

Similar letters of reference indicate corresponding parts.

My invention has for its object to furnish an improved holder for mops, swabs, and brushes, for mopping, scrubbing, cleaning, and sweeping, which shall be simple in construction and effectual in operation, holding securely the brushes or the rags, old clothes, &c., which may be used for the mop; and it consists in the construction and combination of the various parts of the device, as hereinafter more fully described.

A is the main plate of the holder, which is cast in one piece with the shank B, that is made hollow to receive the handle. The plate A has projecting lugs at its forward edge, forming a jaw that is adapted to hold the mop, and against which the stock of the brush is placed.

The middle part of the plate A is open, to make the holder lighter, and to form a bar, around which the mop may be passed. C is the upper or clamping jaw, the middle part of which is also open, and there are teeth or prongs upon the under side of its forward edge, that enable it to take a firmer hold upon the mop or brush stock, and prevent the slipping of the said mop or stock.

The shank B is hollow, and its lower part is slotted or mortised. The jaw C is pivoted to the socket B. In the drawing the pivot is shown as made by studs projecting at each side of a lever-arm, C′, that enters the mortise in B, and the studs rest against the inner side of the lower end of the shank B, as shown in Fig. 2, and in dotted lines in Fig. 1.

By this construction, by raising the jaw C and turning it about one-quarter around, the studs upon its lever-arm will come in line with the slot of the shank B, so that the said jaw can be conveniently detached when desired.

D is a lever to the jaw C. The upper end of this lever enters the slot in the shank B, where it is pivoted by a pin or rivet that passes through the shank B, and through a hole in the end of the lever D. The lever D serves to actuate the clamping-jaw C, and cause the same to hold a mop or brush.

The outer surface of the shank B has a screw-thread cast upon it, into which fits the screw-thread cast upon the inner surface of the ring-nut E, so that by screwing down the nut E the lever D and jaw C may be moved to firmly clamp the mop or brush stock.

In the case of brushes, &c., the jaw C may be removed, if desired, and the stock clamped to the plate A by means of the lever D.

I claim as my invention—

1. The mop-fabric or brush holder, having the jaw A and shank B cast in one piece, and the jaw C upon a lever-arm that enters a slot or mortise in the shank B, substantially as set forth.

2. In a mop-fabric and brush holder, the rigid jaw A, cast in one piece with the screw-shank B, a lever swinging in a mortise in the shank B, and a ring-nut to move such lever, substantially as set forth.

3. In a mop-fabric and brush holder, the jaw A, made as an open frame, for receiving the mop fabric, and cast in one piece with the screw-shank B, substantially as set forth.

4. In a mop-fabric and brush holder, a stationary jaw having projections, and a swinging jaw having teeth, whereby the parts are adapted to grasping a mop fabric or a brush-stock, substantially as set forth.

5. The lever D, ring-nut E, and clamping-jaw C, in combination with the fixed jaw A and screw-socket B, substantially as set forth.

Signed by me this 26th day of January, A. D. 1876.

DAVID EDWARD.

Witnesses:

CHARLES DUNCAN,
JAMES MILLER.